United States Patent
Harada et al.

(10) Patent No.: US 11,329,592 B2
(45) Date of Patent: May 10, 2022

(54) MOTOR CONTROL DEVICE

(71) Applicant: HONDA MOTOR CO., LTD., Tokyo (JP)

(72) Inventors: Tsuyoshi Harada, Wako (JP); Akitomo Komatsuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/187,895

(22) Filed: Mar. 1, 2021

(65) Prior Publication Data

US 2021/0281204 A1 Sep. 9, 2021

(30) Foreign Application Priority Data

Mar. 6, 2020 (JP) .............................. JP2020-038676

(51) Int. Cl.
*H02P 27/08* (2006.01)
*H02M 7/5387* (2007.01)
*H02P 29/68* (2016.01)

(52) U.S. Cl.
CPC ........ *H02P 27/08* (2013.01); *H02M 7/53871* (2013.01); *H02P 29/68* (2016.02); *H02P 2201/09* (2013.01)

(58) Field of Classification Search
CPC ...... H02P 1/00; H02P 1/04; H02P 1/16; H02P 1/163; H02P 1/18; H02P 1/24; H02P 1/26; H02P 1/28; H02P 1/42; H02P 1/46; H02P 1/54; H02P 3/00; H02P 4/00; H02P 5/00; H02P 6/00; H02P 6/08; H02P 21/00; H02P 21/18; H02P 23/07; H02P 23/14; H02P 25/062; H02P 27/00; H02P 27/04; H02P 27/06; H02P 27/08; H02P 29/00

See application file for complete search history.

(56) References Cited

U.S. PATENT DOCUMENTS 9,143,079 B2 * 9/2015 Kakimoto ......... H02M 7/53871
2017/0214351 A1 7/2017 Lelkes et al.

FOREIGN PATENT DOCUMENTS

| CN | 106941333 | 7/2017 |
| JP | 2006-174689 | 6/2006 |
| JP | 3797361 | 7/2006 |
| JP | 2017-158280 | 9/2017 |
| WO | 2004/114511 | 12/2004 |
| WO | 2009/038047 | 3/2009 |

OTHER PUBLICATIONS

Japanese Notice of Allowance for Japanese Patent Application No. 2020-038676 dated Dec. 7, 2021.

* cited by examiner

*Primary Examiner* — Antony M Paul
(74) *Attorney, Agent, or Firm* — Amin, Turocy & Watson, LLP

(57) ABSTRACT

A motor control device includes an optimal voltage calculation part configured to calculate an input voltage that is a lowest total of electric power losses generated by an inverter, a motor and a converter, a lowest voltage calculation part configured to calculate a lowest value of the input voltage required at a motor operating point, and a target value setting part configured to set any one of the optimal input voltage and the lowest input voltage as the target input voltage, and the target value setting part sets the lowest input voltage lower than the optimal input voltage to the target value when the element temperature of the inverter and the converter is equal to or greater than a predetermined value.

4 Claims, 13 Drawing Sheets

FIG. 5

| ROTATIONAL SPEED Nm | TARGET SETTING TORQUE Tref | LOWEST INPUT VOLTAGE Vmin |
|---|---|---|
| Nm1 | T1 | Vmin1 |
| Nm2 | T2 | Vmin2 |
| Nm3 | T3 | Vmin3 |
| ⋮ | ⋮ | ⋮ |

FIG. 11A

| ROTATIONAL SPEED Nm | FIRST TARGET SETTING TORQUE Tref1 | LOWEST INPUT VOLTAGE Vm |
|---|---|---|
| Nm1 | T11 | Vm1 |
| Nm2 | T12 | Vm2 |
| Nm3 | T13 | Vm3 |
| ⋮ | ⋮ | ⋮ |

FIG. 11B

| ROTATIONAL SPEED Ng | SECOND TARGET SETTING TORQUE Tref2 | LOWEST INPUT VOLTAGE Vg |
|---|---|---|
| Ng1 | T21 | Vg1 |
| Ng2 | T22 | Vg2 |
| Ng3 | T23 | Vg3 |
| ⋮ | ⋮ | ⋮ |

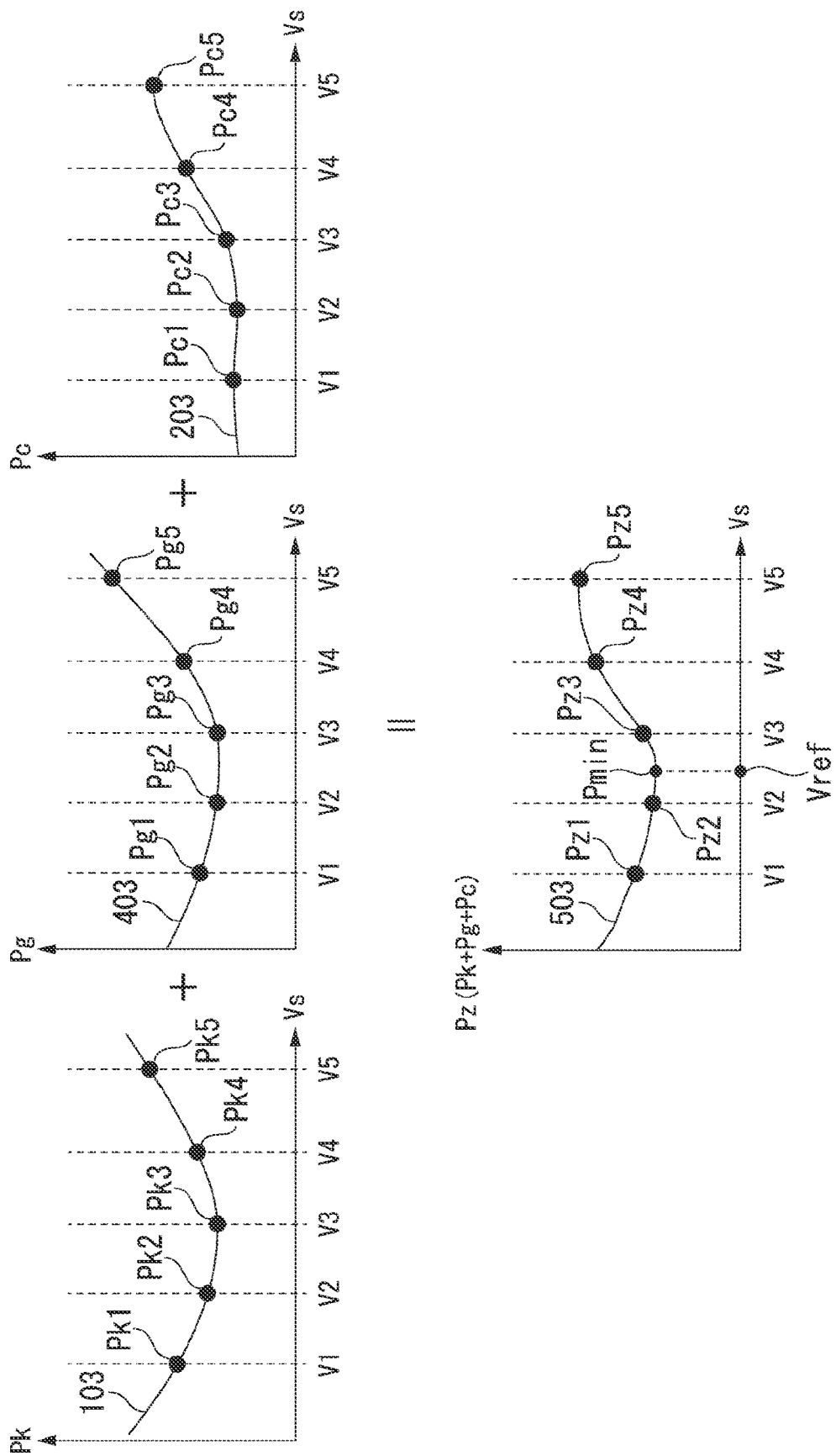

MOTOR CONTROL DEVICE

CROSS-REFERENCE TO RELATED APPLICATION

Priority is claimed on Japanese Patent Application No. 2020-038676, filed Mar. 6, 2020, the content of which is incorporated herein by reference.

BACKGROUND OF THE INVENTION

Field of the Invention

The present invention relates to a motor control device.

Description of Related Art

Japanese Patent No. 3797361 discloses a motor control device configured to control driving of a traveling motor mounted on a vehicle.

This motor control device includes a converter configured to boost an output voltage from a battery to a predetermined voltage, and an inverter configured to supply the voltage boosted by the converter (hereinafter, referred to as "an input voltage") to a motor. The motor control device calculates a target value of an input voltage appropriate for an efficient operation of the motor (hereinafter, referred to as "a target input voltage") according to a rotational speed of the motor and a target value (hereinafter, referred to as "a target setting torque") of a torque generated in the motor (hereinafter, referred to as "a motor torque"), and PWM-controls a switching element of the converter such that an input voltage becomes a target input voltage.

SUMMARY OF THE INVENTION

Here, since as the input voltage increases or as the current passing through the inverter or the converter increases, or these occur at the same time, there is a problem that a loss of a semiconductor element such as a switching element, a diode, or the like, of the inverter or the converter becomes large and the amount of heat generation becomes large.

An aspect of the present invention is directed to providing a motor control device in which heat generation of a semiconductor element included in at least one of an inverter and a converter is suppressed.

(1) An aspect of the present invention is a motor control device configured to control driving of a motor using electric power from a direct current power supply, the motor control device including: an inverter that is configured to convert direct current electric power output from the direct current power supply into alternating current electric power and that is configured to supply the converted electric power to the motor; a converter that is configured to convert a direct current voltage from the direct current power supply into an input voltage, which is a voltage input to the inverter, and that is configured to supply the converted voltage to the inverter; a temperature acquisition part configured to measure an element temperature that is a temperature of a semiconductor element included in at least one of the inverter and the converter or configured to estimate a temperature of the semiconductor element; and a control device configured to control at least one of the inverter and the converter such that the input voltage becomes a target input voltage that is a target value, wherein the control device includes: a rotational speed calculating part configured to calculate a rotational speed of the motor; an optimal voltage calculation part configured to calculate an optimal input voltage that is an input voltage at which a total of electric power losses generated in the inverter, the motor and the converter is lowest when the motor is operated at a motor operating point which is defined by the rotational speed that is calculated by the rotational speed calculating part and a target setting torque that is a target value of a torque generated by the motor; a lowest voltage calculation part configured to calculate a lowest input voltage that is a lowest value of the input voltage required to operate the motor at the motor operating point; and a target value setting part configured to set any one of the optimal input voltage and the lowest input voltage as the target input voltage, and the target value setting part sets a lowest input voltage lower than the optimal input voltage to the target input voltage when a measured value or an estimated value of the element temperature is greater than a predetermined value.

(2) In the motor control device of the aspect of the above-mentioned (1), the target value setting part may set the optimal input voltage as the target value when the measured value or the estimated value is less than the predetermined value and when the optimal input voltage is greater than the lowest input voltage, and set the lowest input voltage as the target input voltage when the measured value or the estimated value is equal to or greater than the predetermined value.

(3) In the motor control device of the aspect of the above-mentioned (1) or (2), the motor control device may further include a voltage detection part configured to detect the direct current voltage; a current detection part configured to detect an output current that is a current output from the direct current power supply to the converter; a first storage part configured to have previously stored a first loss map in which an operating point loss map, which shows a correspondence between the rotational speed, the target setting torque and a first electric power loss that is a total value of the electric power loss of the motor and the electric power loss of the inverter, is associated with each of the plurality of input voltages; a second storage part configured to previously store a second loss map in which a converter loss map which shows a correspondence between the direct current voltage, the output current and a second electric power loss that is the electric power loss of the converter, is associated with each of the plurality of input voltages; and a lowest voltage acquisition map which shows a correspondence between the rotational speed, the target setting torque and the lowest input voltage, the optimal voltage calculation part may include: a first acquisition part configured to acquire a first correspondence relationship between the input voltage and the first electric power loss by reading the first electric power loss, which corresponds to the rotational speed of the motor calculated by the rotational speed calculating part and the target setting torque indicated by a torque instruction value obtained from the outside, from each of the plurality of operating point loss maps; a second acquisition part configured to acquire a second correspondence relationship between the input voltage and the second electric power loss by reading the second electric power loss, which corresponds to the direct current voltage measured by the voltage detection part and the output current measured by the current detection part from each of a plurality of converter loss maps; and a determination part configured to obtain an input voltage that is a lowest total of the first electric power loss and the second electric power loss on the basis of the first correspondence relationship and the second correspondence relationship and transmit the input voltage to the target value setting part as the optimal input voltage, and the lowest voltage calculation part may read the lowest input voltage, which corresponds to the rotational speed of the motor calculated by the rotational speed calculating part and the target setting torque indicated by the torque instruction value, from the lowest voltage acquisition map, and transmits the read lowest input voltage to the target value setting part.

According to the aspect of the present invention, it is possible to minimize heat generation of a semiconductor element included in at least one of the inverter and the converter.

BRIEF DESCRIPTION OF THE DRAWINGS

FIG. 5 is a view for describing an example of a lowest voltage acquisition map according to the first embodiment.

FIG. 11A is a view for describing an example of a first lowest voltage acquisition map according to the second embodiment.

FIG. 11B is a view for describing an example of a second lowest voltage acquisition map according to the second embodiment.

FIG. 12 is a view for describing a calculation method of an optimal input voltage according to the second embodiment.

DETAILED DESCRIPTION OF THE INVENTION

Hereinafter, motor control device according to embodiments will be described with reference to the accompanying drawings.

First Embodiment

Figure 1:
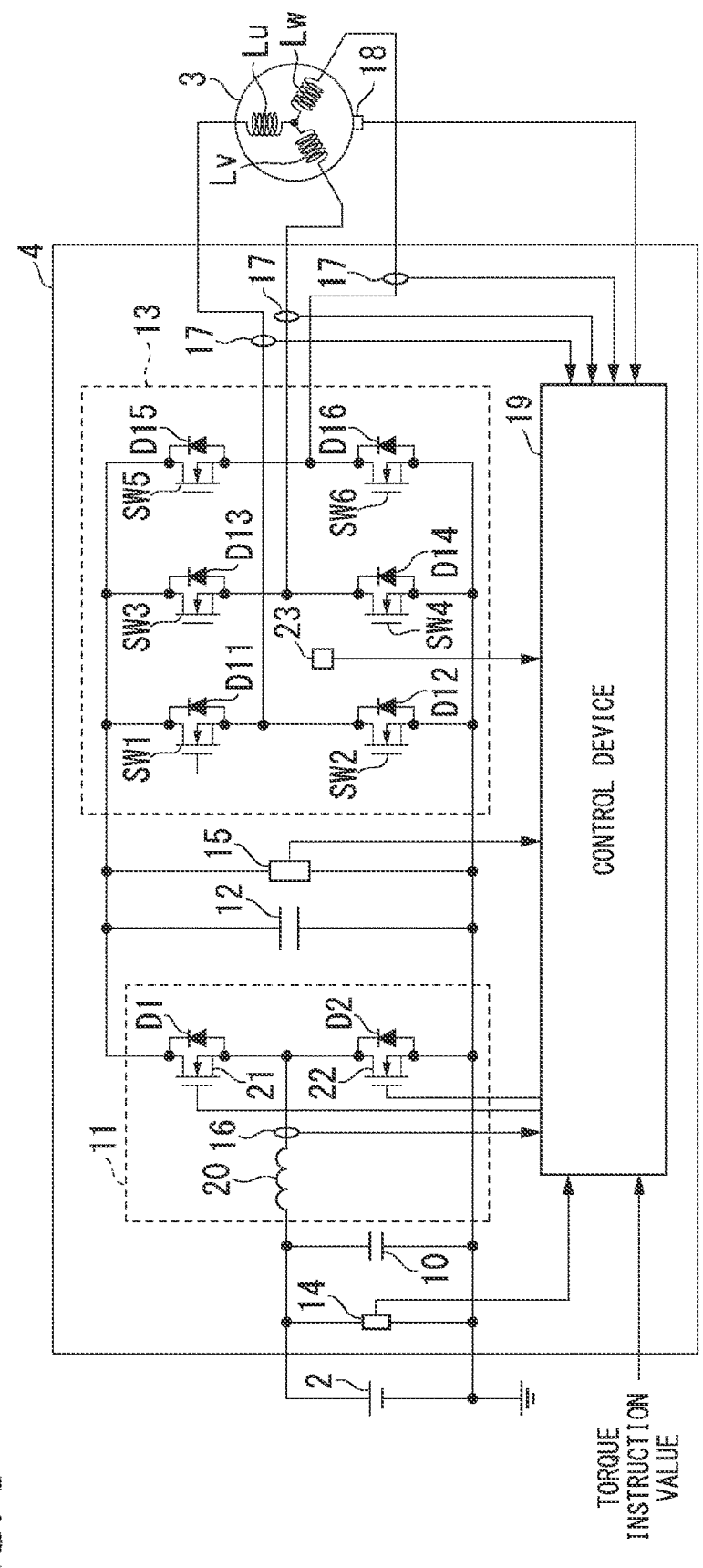
FIG. 1 is a view showing an example of a schematic configuration of a vehicle including a motor control device according to a first embodiment.

FIG. 1 is a view showing an example of a schematic configuration of a vehicle 1 including a motor control device 4 according to a first embodiment. The vehicle 1 is a vehicle including a traveling motor, for example, a hybrid automobile, an electric automobile, or the like.

As shown in FIG. 1, the vehicle 1 includes a direct current power supply 2, a motor 3 and the motor control device 4.

The direct current power supply 2 is mounted on the vehicle 1. The direct current power supply 2 is, for example, a battery, which is a secondary battery such as a nickel hydride battery, a lithium ion battery, or the like. However, there is no limitation thereto, and the direct current power supply 2 may be an electric double layer capacitor (a capacitor) instead of a secondary battery.

The motor 3 is an electric motor, driving of which is controlled by the motor control device 4. For example, the motor 3 is a traveling motor of a vehicle.

In the first embodiment, the motor 3 is a three-phase (U, V and W) brushless motor. Specifically, the motor 3 includes a rotor (not shown) having a permanent magnet, and a stator (not shown) on which coils Lu, Lv and Lw corresponding to three phases (a U phase, a V phase and a W phase), respectively, are sequentially wound in a rotation direction of the rotor. Then, the coils Lu, Lv and Lw of the phases are connected to the motor control device 4. However, the motor 3 is not limited to a brushless motor and may be, for example, an induction motor.

Further, the motor 3 may be a motor generator. That is, the motor 3 is used as an electric motor configured to start an engine of the vehicle 1 while also being used as a generator driven by the engine. The motor 3 of the first embodiment is mainly operated as an electric motor, and drives wheels of the vehicle 1.

The motor control device 4 converts direct current electric power from the direct current power supply 2 into alternating current electric power and supplies the converted electric power to the motor 3. In addition, the motor control device 4 may convert regenerative electric power generated by the motor 3 into direct current electric power and supply the converted electric power to the direct current power supply 2.

In the following description, the configuration of the motor control device 4 according to the first embodiment will be described with reference to FIG. 1. The motor control device 4 according to the first embodiment includes a capacitor 10, a boosting converter 11, a capacitor 12, an inverter 13, a first voltage sensor 14, a second voltage sensor 15, a first current sensor 16, a second current sensor 17, a rotation angle sensor 18, a temperature acquisition part 23 and a control device 19.

The capacitor 10 is a smoothing capacitor which is provided on a primary side of the boosting converter 11 (on the side of the direct current power supply 2). Specifically, the capacitor 10 has one end connected to a positive terminal of the direct current power supply 2 and the other end connected to a negative terminal of the direct current power supply 2. The negative terminal of the direct current power supply 2 is earthed.

The boosting converter 11 boosts a direct current voltage Vb output from the direct current power supply 2 to a predetermined boosting ratio. A voltage boosted to by the boosting converter 11 is a voltage (hereinafter, referred to as "an input voltage") Vs that is input into the inverter 13. In this way, the boosting converter 11 generates the input voltage Vs by boosting the direct current voltage Vb output from the direct current power supply 2 to a predetermined boosting ratio, and outputs the input voltage Vs to the inverter 13. Further, the boosting converter 11 may include a function of stepping down the regenerative voltage input from the inverter 13 to a predetermined step-down ratio and outputting the stepped-down voltage to the direct current power supply 2. Further, the boosting converter 11 is an example of "a converter" of the present invention. Hereinafter, an example of a schematic configuration of the boosting converter 11 will be described.

The boosting converter 11 includes a reactor 20, and an upper switching element 21 and a lower switching element 22 connected to each other in series.

The reactor 20 has one end connected to one end of the capacitor 10, and the other end connected to a connecting point between the upper switching element 21 and the lower switching element 22.

While a case in which the upper switching element 21 and the lower switching element 22 are insulated gate bipolar transistors (IGBTs) will be described below, the present invention is not limited thereto, and for example, they may be a field effective transistor (FET) or the like.

A collector terminal of the upper switching element 21 is connected to one terminal of the capacitor 12. An emitter terminal of the upper switching element 21 is connected to the other end of the reactor 20. A base terminal of the upper switching element 21 is connected to the control device 19.

A collector terminal of the lower switching element 22 is connected to the other end of the reactor 20. An emitter terminal of the lower switching element 22 is connected to a negative terminal of the direct current power supply 2. A base terminal of the lower switching element 22 is connected to the control device 19.

Further, the boosting converter 11 includes diodes D (the diode D1 and the diode D2) connected in parallel to the upper switching element 21 and the lower switching element 22, respectively, in opposite directions.

The capacitor 12 is connected to a secondary side of the boosting converter 11 (on the side of the inverter 13). The capacitor 12 is a smoothing capacitor having one end connected to a collector terminal of the upper switching element 21 and the other end connected to the negative terminal of the direct current power supply 2.

The inverter 13 converts the direct current electric power output from the direct current power supply 2 into alternating current electric power and supplies the converted electric power to the motor 3. Specifically, the input voltage Vs is supplied from the boosting converter 11 to the inverter 13. The inverter 13 converts the electric power from the boosting converter 11 into alternating current electric power and supplies the converted electric power to the motor 3. As shown, the inverter 13 of the first embodiment is a three-phase inverter, and includes three switching legs corresponding to each of the phases.

Specifically, the inverter 13 includes a plurality of switching elements SW1 to SW6, and diodes D11 to D16 parallelly connected to the plurality of switching elements SW1 to SW6, respectively, in opposite directions.

Each of the switching elements SW1 to SW6 may be an IGBT or a FET. The switching elements SW1 and SW2 are connected in series to configure a switching leg. The switching elements SW3 and SW4 are connected in series to configure a switching leg. The switching elements SW5 and SW6 are connected in series to configure a switching leg.

A connecting point between the switching element SW1 and the switching element SW2 is connected to the coil Lu. A connecting point between the switching element SW3 and the switching element SW4 is connected to the coil Lv. A connecting point between the switching element SW5 and the switching element SW6 is connected to the coil Lw.

The first voltage sensor 14 is connected between the terminals of the direct current power supply 2, and detects the direct current voltage Vb output from the direct current power supply 2. In other words, the first voltage sensor 14 is a sensor attached between the terminals of the capacitor 10 and configured to detect a voltage of the capacitor 10. The first voltage sensor 14 outputs the detected direct current voltage Vb to the control device 19. Further, the first voltage sensor 14 is an example of "a voltage detection part" of the present invention.

The second voltage sensor 15 detects the input voltage Vs supplied from the boosting converter 11 to the inverter 13. The second voltage sensor 15 is attached between the terminals of the capacitor 12. The second voltage sensor 15 outputs the detected input voltage Vs to the control device 19.

The first current sensor 16 detects an output current Ib that is a current output from the direct current power supply 2 to the boosting converter 11. The first current sensor 16 outputs the detected output current Ib to the control device 19. For example, the first current sensor 16 detects the output current Ib by detecting the current flowing to the reactor 20. However, there is no limitation thereto, and the first current sensor 16 may be connected to any position as long as the output current Ib that is a current output from the direct current power supply 2 to the boosting converter 11 can be detected. The first current sensor 16 may be a current sensor including a current transistor (CT) or a Hall element, or may have a shunt resistor and detect the output current Ib from voltages of both ends of the shunt resistor. Further, the first current sensor 16 is an example of "a current detection part" of the present invention.

The plurality of second current sensors 17 detect phase currents of the three phases (U, V and W). That is, the plurality of second current sensors 17 detect a phase current value (hereinafter, referred to as "a U phase current value") Iu flowing through the coil Lu of the U phase, a phase current value (hereinafter, referred to as "a V phase current value") Iv flowing through the coil Lv of the V phase, and a phase current value (hereinafter, referred to as "a W phase current value") Iw flowing through the coil Lw of the W phase, and outputs the detected phase current values to the control device 19. For example, the plurality of second current sensors 17 may be provided between the inverter 13 and the motor 3 or may be provided in the inverter 13. While the second current sensor 17 is not particularly limited as long as a configuration for detecting a phase current of each phase is provided, for example, the second current sensor 17 may be a current transistor (CT) including a transformer or a current sensor including a Hall element. In addition, the second current sensor 17 may include a shunt resistor and detect a phase current from voltages of both ends of the shunt resistor.

The rotation angle sensor 18 detects a rotation angle of the motor 3. The rotation angle of the motor 3 is an electrical angle of the rotor from the predetermined reference rotation position. The rotation angle sensor 18 outputs the detection signal showing the detected rotation angle to the control device 19. For example, the rotation angle sensor 18 may include a resolver.

The temperature acquisition part 23 detects a temperature (hereinafter, referred to as "element temperature") Ksw of a switching element in the inverter 13. For example, the temperature acquisition part 23 may detect a temperature of at least one of the switching elements SW1 to SW6 as an element temperature Ksw. The temperature acquisition part 23 may be provided to be able to come into contact with any one of the switching elements SW1 to SW6 and directly detect the element temperature Ksw of any one of the switching elements SW1 to SW6. In addition, the temperature acquisition part 23 may be provided around any one of the switching elements SW1 to SW6 and indirectly detect the element temperature Ksw that is a temperature of any one of the switching elements SW1 to SW6. Further, the temperature acquisition part 23 may directly or indirectly acquire temperatures of the switching elements SW1 to SW6, and may treat the highest temperature of the temperatures as the temperature Ksw. The temperature acquisition part 23 outputs the detected temperature Ksw to the control device 19.

However, the element temperature Ksw of the embodiment may not be a measured value and may be, for example, an estimated value. For example, the temperature acquisition part 23 may estimate a temperature of the switching element in the inverter 13 on the basis of information such as operating conditions of the motor 3, a water temperature, the other environmental conditions, and the like. In this way, the element temperature Ksw may be a measured value or may be an estimated value. Further, the measured value may be a temperature of the switching element in the inverter 13 or may be a temperature around the switching element.

Here, it is thought that, when the passing current, which is described in the followings, is increased, while the temperature of the switching element in the inverter 13 increases, a temperature of the switching element of the boosting converter 11 also similarly increases. Here, the temperature acquisition part 23 may acquire the temperature of the switching element of the boosting converter 11 as the element temperature Ksw. The temperature acquisition part 23 may measure at least one temperature of the temperatures of the upper switching element 21 and the lower switching element 22 as the element temperature Ksw. The temperature acquisition part 23 may measure a temperature around the upper switching element 21 and the lower switching element 22 as the element temperature Ksw. Further, the temperature acquisition part 23 may acquire the element temperature Ksw by estimating at least one temperature of the upper switching element 21 and the lower switching element 22 on the basis of the information such as the operating conditions of the motor 3, a water temperature, the other environmental conditions, and the like.

The temperature acquisition part 23 may detect a measured value or an estimated value of the temperature of the diode included in any one of the boosting converter 11 and the inverter 13 as the element temperature Ksw. In this way, the temperature acquisition part 23 detects a measured value or an estimated value of a temperature of at least one semiconductor element of the plurality of semiconductor elements among the switching elements SW1 to SW6 in the inverter 13, the diodes D11 to D16 in the inverter 13, the switching elements 21 and 22 in the boosting converter 11 and the diodes D1 and D2 in the boosting converter 11, as the element temperature Ksw.

The control device 19 performs inverter control of pulse width modulation (PWM) control of the switching elements SW1 to SW6 of the inverter 13 on the basis of the torque instruction value. Known technology can be used for this inverter control.

In addition, the control device 19 performs converter control such that the upper switching element 21 and the lower switching element 22 are brought into an ON state or an OFF state such that the input voltage Vs becomes a target value (hereinafter, referred to as "a target input voltage") Vx on the basis of the torque instruction value. For example, the control device 19 PWM-controls the upper switching element 21 and the lower switching element 22 such that the input voltage Vs becomes the target input voltage Vx under the converter control.

Here, the torque instruction value is a target value (hereinafter, referred to as "a target setting torque") Tref of the torque (the motor torque) generated by the motor 3, and is transmitted to the control device 19 from an external device.

The control device 19 may include a processor such as a central processing unit (CPU), a micro processing unit (MPU), or the like, and a non-volatile memory or a volatile semiconductor memory (for example, a random access memory (RAM), a read only memory (ROM), a flash memory, an erasable programmable read only memory (EPROM), and an electrically erasable programmable read only memory (EEPROM)). For example, the control device 19 may have a micro controller such as an MCU or the like. In addition, the control device 19 may have driver circuits of the boosting converter 11 and the inverter 13.

Figure 2:
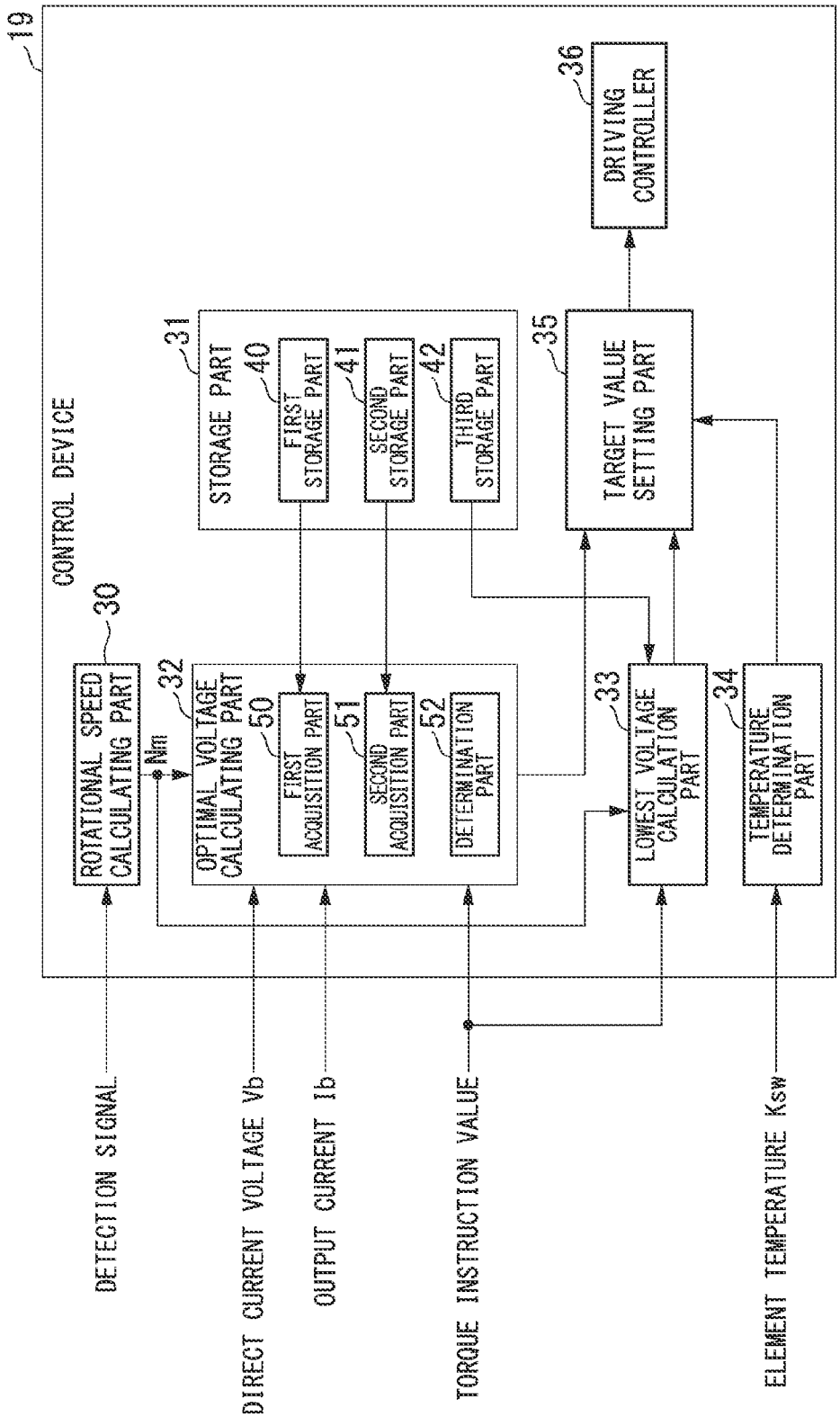
FIG. 2 is a view showing a schematic configuration for performing converter control in the control device according to the first embodiment.

In the following description, a schematic configuration for performing converter control in the control device 19 according to the first embodiment will be described with reference to FIG. 2. FIG. 2 is a view showing an example of a schematic configuration of the control device 19 according to the first embodiment.

The control device 19 includes a rotational speed calculating part 30, a storage part 31, an optimal voltage calculation part 32, a lowest voltage calculation part 33, a temperature decision part 34, a target value setting part 35 and a driving controller 36.

The rotational speed calculating part 30 calculates a rotational speed Nm of the motor 3 on the basis of the detection signal output from the rotation angle sensor 18. The rotational speed calculating part 30 calculates the rotational speed Nm using a known technology.

The storage part 31 includes a first storage part 40, a second storage part 41 and a third storage part 42.

Figure 3A:
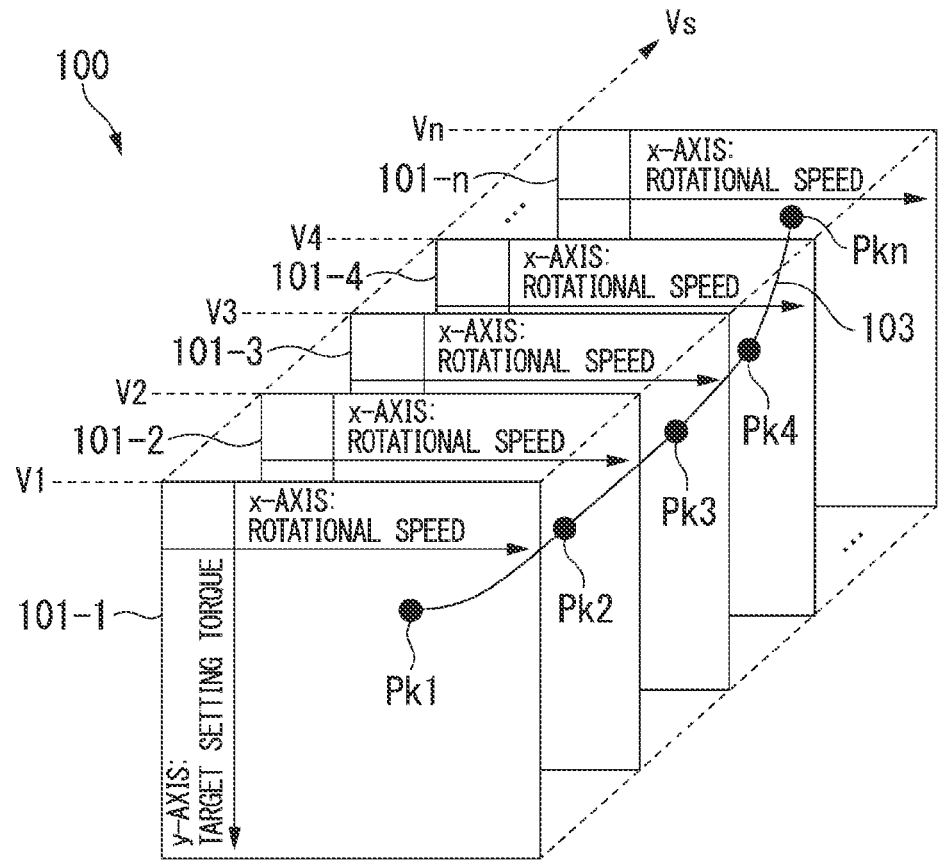
FIG. 3A is a view for describing a first loss map according to the first embodiment.
Figure 3B:
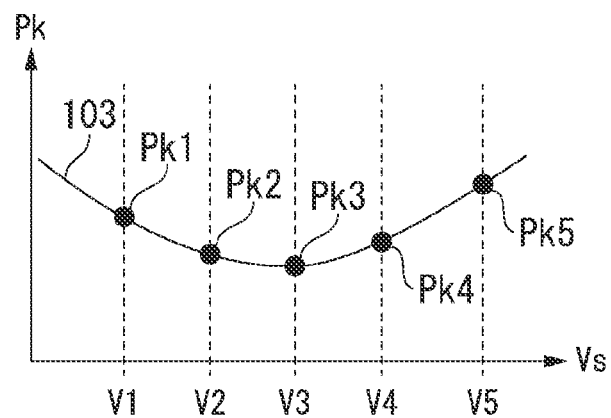
FIG. 3B is a view for describing the first loss map according to the first embodiment.

A first loss map 100 is previously stored in the first storage part 40. FIG. 3A and FIG. 3B are views for describing the first loss map 100 according to the first embodiment.

In the first loss map 100, an operating point loss map 101 showing correspondence between the rotational speed Nm of the motor 3, the target setting torque Tref, and electric power losses Pk of the motor 3 and the inverter 13 is associated with each of the plurality of input voltages Vs, respectively. Further, the electric power loss Pk according to the embodiment is an example of "a first electric power loss" of the present invention. The electric power loss Pk is a total of the electric power loss of the motor 3 and the electric power loss of the inverter 13. The first loss map 100 is previously set, for example, experimentally or theoretically.

Each of the operating point loss maps 101 is information for calculating the electric power loss Pk from the rotational speed Nm and the target setting torque Tref. Here, the rotational speed Nm and the target setting torque Tref define an operation of the motor 3, i.e., a motor operating point. Accordingly, each of the operating point loss maps 101 is information for calculating the electric power loss Pk generated when the motor 3 is operated at the motor operating point defined by the rotational speed Nm and the target setting torque Tref.

In the example shown in FIG. 3A, in the first loss map 100, the operating point loss map 101 is associated with each of a plurality of input voltages V1 to Vn. In the example shown in FIG. 3A, an operating point loss map 101-1 defines correspondence between the target setting torque Tref, the rotational speed Nm of the motor 3 and the electric power loss Pk1, when the input voltage Vs is the input voltage V1. An operating point loss map 101-2 defines correspondence between the target setting torque Tref, the rotational speed Nm of the motor 3 and the electric power loss Pk2, when the input voltage Vs is the input voltage V2. An operating point loss map 102-3 defines correspondence between the target setting torque Tref, the rotational speed Nm of the motor 3 and the electric power loss Pk3 when the input voltage Vs is the input voltage V3. An operating point loss map 102-4 defines correspondence between the target setting torque Tref, the rotational speed Nm of the motor 3 and the electric power loss Pk4 when the input voltage Vs is the input voltage V4. An operating point loss map 102-5 defines correspondence between the target setting torque Tref, the rotational speed Nm of the motor 3 and the electric power loss Pk5 when the input voltage Vs is the input voltage V5. An operating point loss map 102-n (n is an integer) defines correspondence between the target setting torque Tref, the rotational speed Nm of the motor 3 and the electric power loss Pkn, when the input voltage Vs is the input voltage Vn.

Accordingly, when the motor operating point is set, correspondence (hereinafter, referred to as "a first correspondence relationship") 103 (for example, dependency of the input voltage Vs with respect to the electric power loss Pk) between the input voltage Vs and the electric power loss Pk is obtained from the first loss map 100. That is, as shown in FIG. 3B, when the motor operating point is set, if one of the electric power loss Pk and the input voltage Vs is determined, a correlation determined by the other is obtained as a first correspondence relationship 103. The first correspondence relationship 103 may be a calculation formula, may be a lookup table, or may be graphed.

Figure 4A:
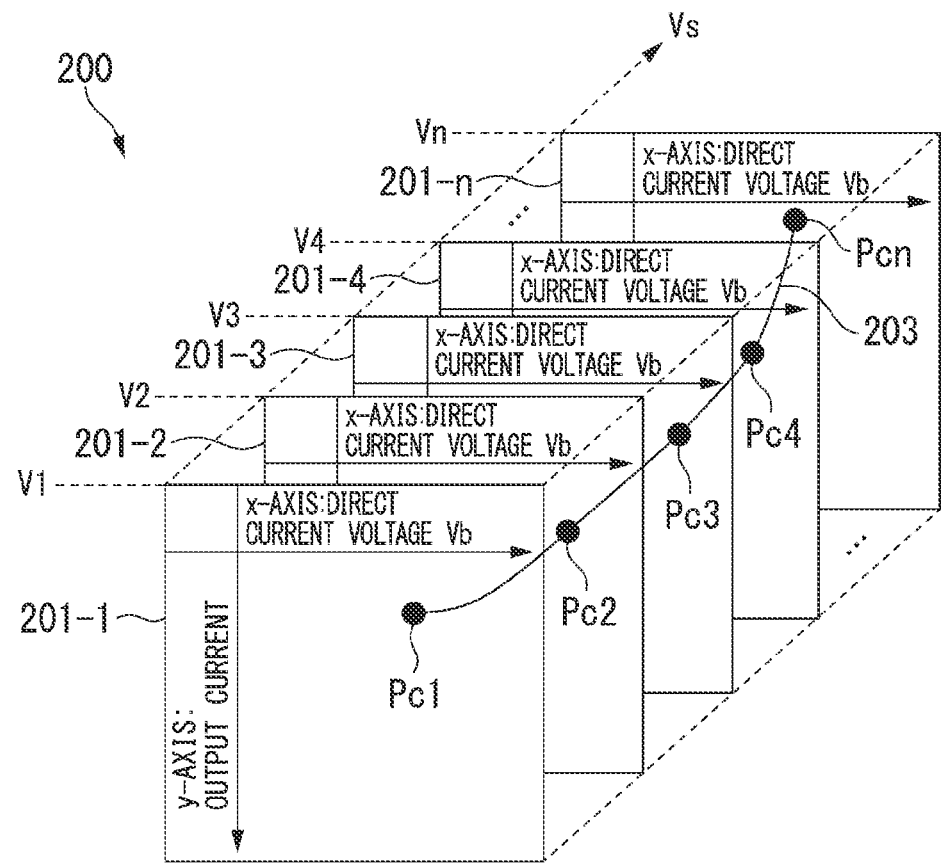
FIG. 4A is a view for describing a second loss map according to the first embodiment.
Figure 4B:
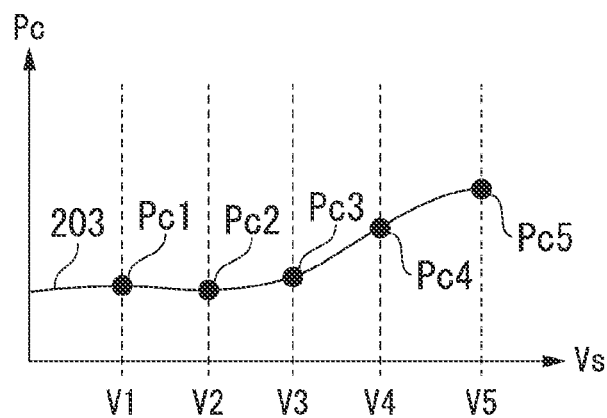
FIG. 4B is a view for describing the second loss map according to the first embodiment.

A second loss map 200 is previously stored in the second storage part 41. FIG. 4A and FIG. 4B is a view for describing the second loss map 200 according to the first embodiment.

In the second loss map 200, a converter loss map 201 showing correspondence between an output current I1, the direct current voltage Vb, and an electric power loss Pc of the boosting converter 11 is associated with each of the plurality of input voltages Vs. The second loss map 200 is previously set experimentally or theoretically, for example.

The converter loss map 201 is information for calculating the electric power loss Pc from the output current I1 and the direct current voltage Vb. Further, the electric power loss Pc according to the embodiment is an example of "a second electric power loss" of the present invention.

In the example shown in FIG. 4A, in the second loss map 200, the converter loss map 201 is associated with each of the plurality of input voltages V1 to Vn. In the example shown in FIG. 4A, the converter loss map 201-1 defines correspondence between the output current I1, the direct current voltage Vb and the electric power loss Pc1, when the input voltage Vs is the input voltage V1. The converter loss map 201-2 defines correspondence between the output current I1, the direct current voltage Vb and the electric power loss Pc2, when the input voltage Vs is the input voltage V2. The operating point loss map 102-3 defines correspondence between the output current I1, the direct current voltage Vb and the electric power loss Pc3, when the input voltage Vs is the input voltage V3. The operating point loss map 102-4 defines correspondence between the output current I1, the direct current voltage Vb and the electric power loss Pc4, when the input voltage Vs is the input voltage V4. The operating point loss map 102-5 defines correspondence between the output current I1, the direct current voltage Vb and the electric power loss Pc5, when the input voltage Vs is the input voltage V5. The operating point loss map 102-n defines correspondence between the output current I1, the direct current voltage Vb and the electric power loss Pcn, when the input voltage Vs is the input voltage Vn.

Accordingly, when the motor operating point is set, correspondence between the input voltage Vs and the electric power loss Pc (hereinafter, referred to as "a second correspondence relationship") 203 (for example, dependency of the input voltage Vs with respect to the electric power loss Pc) is obtained from the second loss map 200. That is, as shown in FIG. 4B, when the motor operating point is set, if one of the electric power loss Pc and the input voltage Vs is determined, a correlation determined by the other is obtained as a second correspondence relationship 203. The correspondence 203 may be a calculation formula, may be a lookup table, or may be graphed.

A lowest voltage acquisition map 300 is previously stored in the third storage part 42. FIG. 5 is a view for describing an example of the lowest voltage acquisition map 300 according to the first embodiment.

The lowest voltage acquisition map 300 is information showing correspondence between the rotational speed Nm of the motor 3, the target setting torque Tref and a lowest input voltage Vmin. The lowest input voltage Vmin is a lowest value of the input voltage Vs required to operate the motor 3 at the motor operating point defined by the rotational speed Nm and the target setting torque Tref of the motor 3.

For example, the lowest voltage acquisition map 300 may be a calculation formula, may be a lookup table, or may be graphed. The lowest voltage acquisition map 300 may be determined experimentally or theoretically such that the lowest input voltage Vmin can be determined on the basis of the rotational speed Nm and the target setting torque Tref of the motor 3. For example, as shown in FIG. 5, when the lookup table previously set as the lowest voltage acquisition map 300 is used, the lowest voltage acquisition map 300 is a lookup table including the rotational speeds Nm, the target setting torques Tref, and the lowest input voltages Vmin associated with combinations of the rotational speeds Nm and the target setting torques Tref.

The optimal voltage calculation part 32 calculates the input voltage Vs at which a total of the electric power loss generated by each of the motor 3, the inverter 13, and the boosting converter 11 is lowest as an optimal input voltage Vref, when the motor 3 is operated at the motor operating point defined by the rotational speed Nm calculated by the rotational speed calculating part 30 and the target setting torque Tref that is a target value of the torque generated by the motor 3.

In the following description, a schematic configuration of the optimal voltage calculation part 32 according to the first embodiment will be described.

The optimal voltage calculation part 32 includes a first acquisition part 50, a second acquisition part 51 and a determination part 52.

The first acquisition part 50 refers the first loss map 100 stored in the first storage part 40. Then, the first acquisition part 50 acquires the first correspondence relationship 103 between the input voltage Vs and the electric power loss Pk by reading the electric power loss Pk corresponding to the rotational speed Nm of the motor calculated by the rotational speed calculating part 30 and the target setting torque Tref indicated by the torque instruction value obtained from the outside from each of the plurality of operating point loss maps 101.

The second acquisition part 51 refers the second loss map 200 stored in the second storage part 41. Then, the second acquisition part 51 acquires the second correspondence relationship 203 between the input voltage Vs and the electric power loss Pc by reading the electric power loss Pc corresponding to the direct current voltage Vb detected by the first voltage sensor 14 and the output current Ib detected by the first current sensor 16 from each of the plurality of converter loss maps 201.

The determination part 52 obtains the input voltage Vs at which a total of the electric power loss Pk and the electric power loss Pc (hereinafter, referred to as "a total loss") Ps is lowest on the basis of the first correspondence relationship 103 and the second correspondence relationship 203. Then, the determination part 52 transmits the input voltage Vs to the target value setting part 35 as the optimal input voltage Vref.

Figure 6:
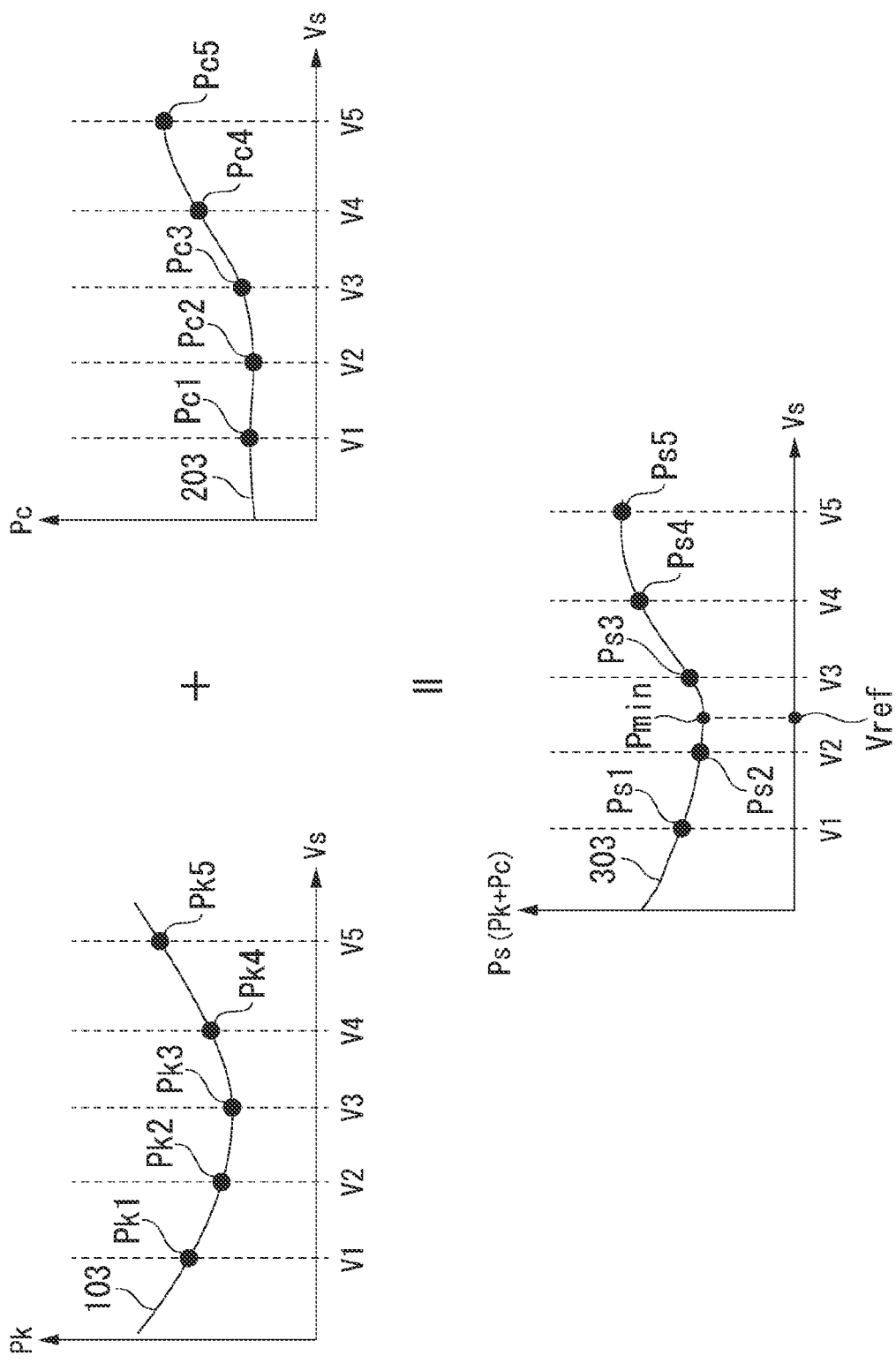
FIG. 6 is a view for describing a calculation method of an optimal input voltage according to the first embodiment.

As an example, as shown in FIG. 6, the determination part 52 synthesizes the first correspondence relationship 103 and the second correspondence relationship 203 and obtains a third correspondence 303 that is a correspondence between the input voltage Vs and the total loss Ps. The third correspondence 303 may be a calculation formula, may be a lookup table, or may be graphed. For example, as shown in FIG. 6, in the first correspondence relationship 103, the electric power loss Pk corresponding to each of input voltages V1 to V5 (n=5) is defined. In addition, in the second correspondence relationship 203, the electric power loss Pc corresponding to each of the input voltages V1 to V5 (n=5) is defined. Accordingly, the determination part 52 can obtain the third correspondence 303 in which electric power loss Ps (Ps1 to Ps5) corresponding to the respective input voltages V1 to V5 (n=5) are defined by summing the electric power loss Pk and the electric power loss Pc of the same input voltage for each input voltage. Further, the determination part 52 may obtain the electric power loss Ps between two points (for example, between Ps1 and Ps2, between Ps2 and Ps3, between Ps3 and Ps4, and between Ps4 and Ps5) in the third correspondence 303 by applying interpolation processing such as linear supplement, polynomial interpolation, or the like.

Then, the determination part 52 retrieves a lowest electric power Pmin that is the lowest total loss Ps in the third correspondence 303, and obtains the input voltage Vs at the lowest electric power Pmin as the optimal input voltage Vref. That is, the determination part 52 retrieves the lowest input voltage Vs that is the total loss Ps in the third correspondence 303, and obtains the input voltage Vs as the optimal input voltage Vref.

The lowest voltage calculation part 33 reads the lowest input voltage Vmin corresponding to the rotational speed Nm of the motor 3 calculated by the rotational speed calculating part 30 and the target setting torque Tref indicated by the torque instruction value from the lowest voltage acquisition map 300, and transmits the read lowest input voltage Vmin to the target value setting part 35.

A switching element of the inverter 13 or the boosting converter 11 generates heat as a passing current that is a current passing through the inverter 13 or the boosting converter 11 is increased. The temperature decision part 34 acquires the element temperature Ksw from the temperature acquisition part 23, and determines whether the element temperature Ksw is equal to or greater than a predetermined value Kth. When the element temperature Ksw indicated by the torque instruction value is equal to or greater than the predetermined value Kth, the temperature decision part 34 outputs a first decision signal indicating that fact to the target value setting part 35. When the element temperature Ksw is less than the predetermined value Kth, the temperature decision part 34 outputs a second decision signal indicating that fact to the target value setting part 35.

Here, the predetermined value Kth is a threshold for suppressing heat generation, and is determined by an experiment or the like. For example, the predetermined value Kth may be a maximum junction temperature of a switching element which is a detection object, or may be a temperature lower than the maximum junction temperature by a predetermined value.

When the element temperature Ksw is equal to or smaller than the predetermined value Kth, the target value setting part 35 sets the optimal input voltage Vref to the target input voltage Vx as long as the optimal input voltage Vref is larger than the lowest input voltage Vmin. When the element temperature Ksw is less than the predetermined value Kth and the optimal input voltage Vref is equal to or smaller than the lowest input voltage Vmin, the target value setting part 35 sets the lowest input voltage Vmin to the target input voltage Vx. In this way, when the element temperature Ksw is less than the predetermined value Kth, the target value setting part 35 sets the optimal input voltage Vref to the target input voltage Vx as long as the optimal input voltage Vref is greater than the lowest input voltage Vmin, and sets the lowest input voltage Vmin to the target input voltage Vx in the case of the optimal input voltage Vref<the lowest input voltage Vmin.

When the element temperature Ksw exceeds the predetermined value Kth, the target value setting part 35 sets the lowest input voltage Vmin to the target input voltage Vx. The target value setting part 35 outputs the set target input voltage Vx to the driving controller 36.

For example, a flag indicating whether the element temperature Ksw is equal to or smaller than the predetermined value Kth (hereinafter, referred to as "a decision flag") is stored in the target value setting part 35. For example, the decision flag is "0" when the element temperature Ksw is equal to or smaller than the predetermined value Kth, and the decision flag is "1" when the element temperature Ksw exceeds the predetermined value Kth. That is, the decision flag is "1" when the target value setting part 35 acquires the first decision signal from the temperature decision part 34, and the decision flag is "0" when the target value setting part 35 acquires the second decision signal from the temperature decision part 34. The target value setting part 35 checks a value of the decision flag, and sets the lowest input voltage Vmin to the target input voltage Vx when decision flag is "1." Meanwhile, the target value setting part 35 sets the optimal input voltage Vref to the target input voltage Vx when the optimal input voltage Vref is greater than the lowest input voltage Vmin if the decision flag is "0," and sets the lowest input voltage Vmin to the target input voltage Vx when the optimal input voltage Vref is equal to or smaller than the lowest input voltage Vmin.

However, there is no limitation thereto, without using the decision flag, the target value setting part 35 may set a lower voltage among the lowest input voltage Vmin and the optimal input voltage Vref as the target input voltage Vx, when the first decision signal is acquired, and may set the optimal input voltage Vref as the target input voltage Vx, when the second decision signal is acquired.

The driving controller 36 acquires the input voltage Vs detected by the second voltage sensor 15, and PWM-controls the upper switching element 21 and the lower switching element 22 such that the input voltage Vs is the target input voltage Vx. For example, the driving controller 36 may acquire the input voltage Vs detected by the second voltage sensor 15 upon performing PWM-controlling with respect to the upper switching element 21 and the lower switching element 22, and may perform feedback-control (PI control or PID control) such that the input voltage Vs becomes the target input voltage Vx.

Figure 7:
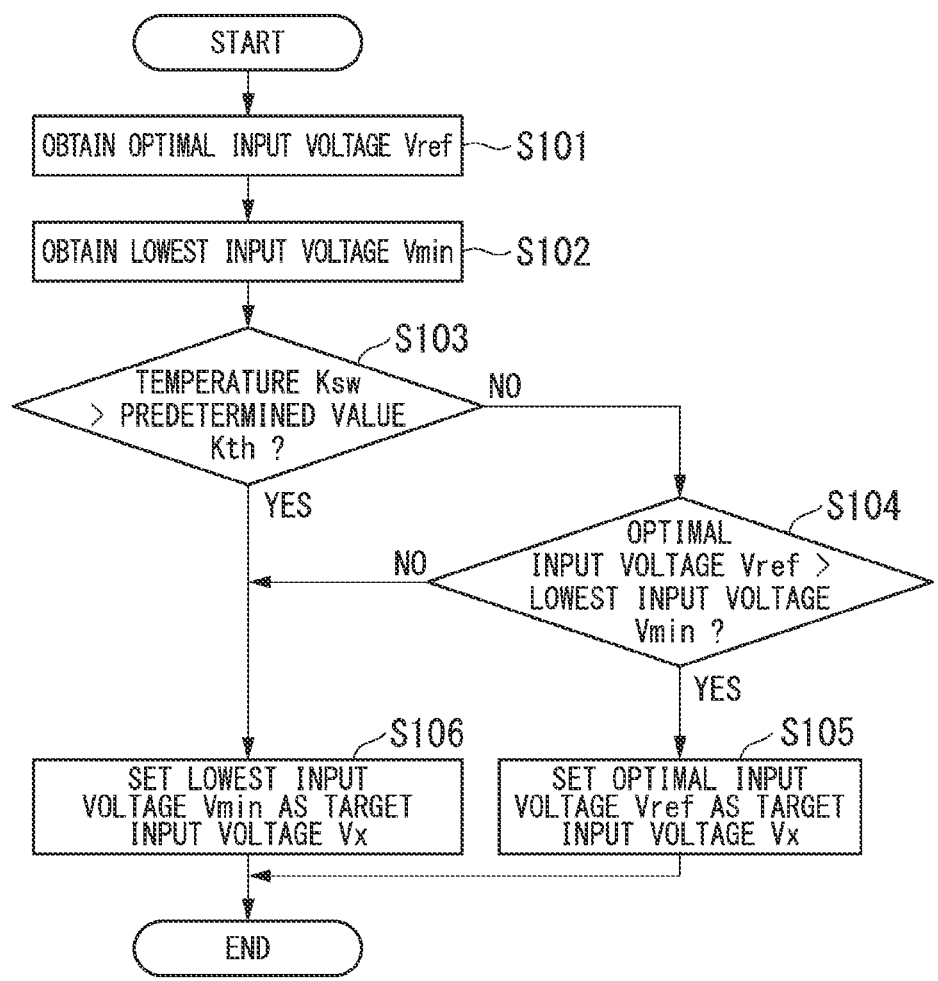
FIG. 7 is a view showing a flow of an operation of the converter control according to the first embodiment.

A flow of an operation of the converter control according to the first embodiment will be described with reference to FIG. 7. FIG. 7 is a view showing a flow of the operation of the converter control according to the first embodiment.

The control device 19 controls the boosting converter 11 by repeating the operation in FIG. 7 for every fixed period.

The optimal voltage calculation part 32 acquires a torque instruction value from an external device, acquires the rotational speed Nm from the rotational speed calculating part 30, and obtains the first correspondence relationship 103 between the input voltage Vs and the electric power loss Pk on the basis of the torque instruction value and the rotational speed Nm. In addition, the optimal voltage calculation part 32 acquires the direct current voltage Vb from the first voltage sensor 14, and acquires the output current Ib from the first current sensor 16, and obtains the second correspondence relationship 203 between the input voltage Vs and the electric power loss Pc on the basis of the direct current voltage Vb and the output current Ib. Then, the optimal voltage calculation part 32 obtains the input voltage Vs at which the total loss Ps of the electric power loss Pk and the electric power loss Pc is lowest and sets the input voltage Vs to the optimal input voltage Vref on the basis of the first correspondence relationship 103 and the second correspondence relationship 203 (step S101).

The lowest voltage calculation part 33 obtains the lowest input voltage Vmin by reading the lowest input voltage Vmin, corresponding to the rotational speed Nm of the motor 3 calculated by the rotational speed calculating part 30 and the target setting torque indicated by the torque instruction value, from the lowest voltage acquisition map 300 (step S102).

The temperature decision part 34 determines whether the element temperature Ksw is greater than the predetermined value Kth (step S103). Then, the temperature decision part 34 outputs the decision result to the target value setting part 35.

The target value setting part 35 determines whether the optimal input voltage Vref is greater than the lowest input voltage Vmin when the element temperature Ksw is equal to or smaller than the predetermined value Kth in the above described decision result (step S104). Then, the target value setting part 35 sets the optimal input voltage Vref to the target input voltage Vx when the optimal input voltage Vref is greater than the lowest input voltage Vmin (step S105). Meanwhile, in step S104, the target value setting part 35 sets the lowest input voltage Vmin as the target input voltage Vx when the optimal input voltage Vref is equal to or smaller than the lowest input voltage Vmin (step S106).

In step S103, the target value setting part 35 sets the lowest input voltage Vmin to the target input voltage Vx when the element temperature Ksw is greater than the predetermined value Kth (step S106).

Next, an effect of the converter control according to the embodiment will be described.

When the passing current is increased, the temperature of the semiconductor element such as the switching element of the boosting converter 11, the switching elements SW1 to SW6 and the diodes D11 to D16 of the inverter 13, or the like, is also increased and heat generation is increased. Accordingly, the control device 19 monitors the element temperature Ksw, and controls the boosting converter 11 such that the lowest input voltage Vmin instead of the optimal input voltage Vref is input to the inverter 13 when the element temperature Ksw is greater than the predetermined value Kth. Accordingly, the electric power loss of the switching elements SW1 to SW6 and the diodes D11 to D16 can be reduced, and heat generation of the switching element or the diodes D11 to D16 in the boosting converter 11 and the inverter 13 can be minimized.

Further, while the optimal input voltage Vref is often greater than the lowest input voltage Vmin, the optimal input voltage Vref may be smaller than the lowest input voltage Vmin under a certain condition. Accordingly, when the element temperature Ksw is equal to or smaller than the predetermined value Kth, the control device 19 may output a higher voltage of the optimal input voltage Vref and the lowest input voltage Vmin. Accordingly, the inverter 13 and the motor 3 can be operated in a state in which efficiency is highest.

Second Embodiment

Figure 8:
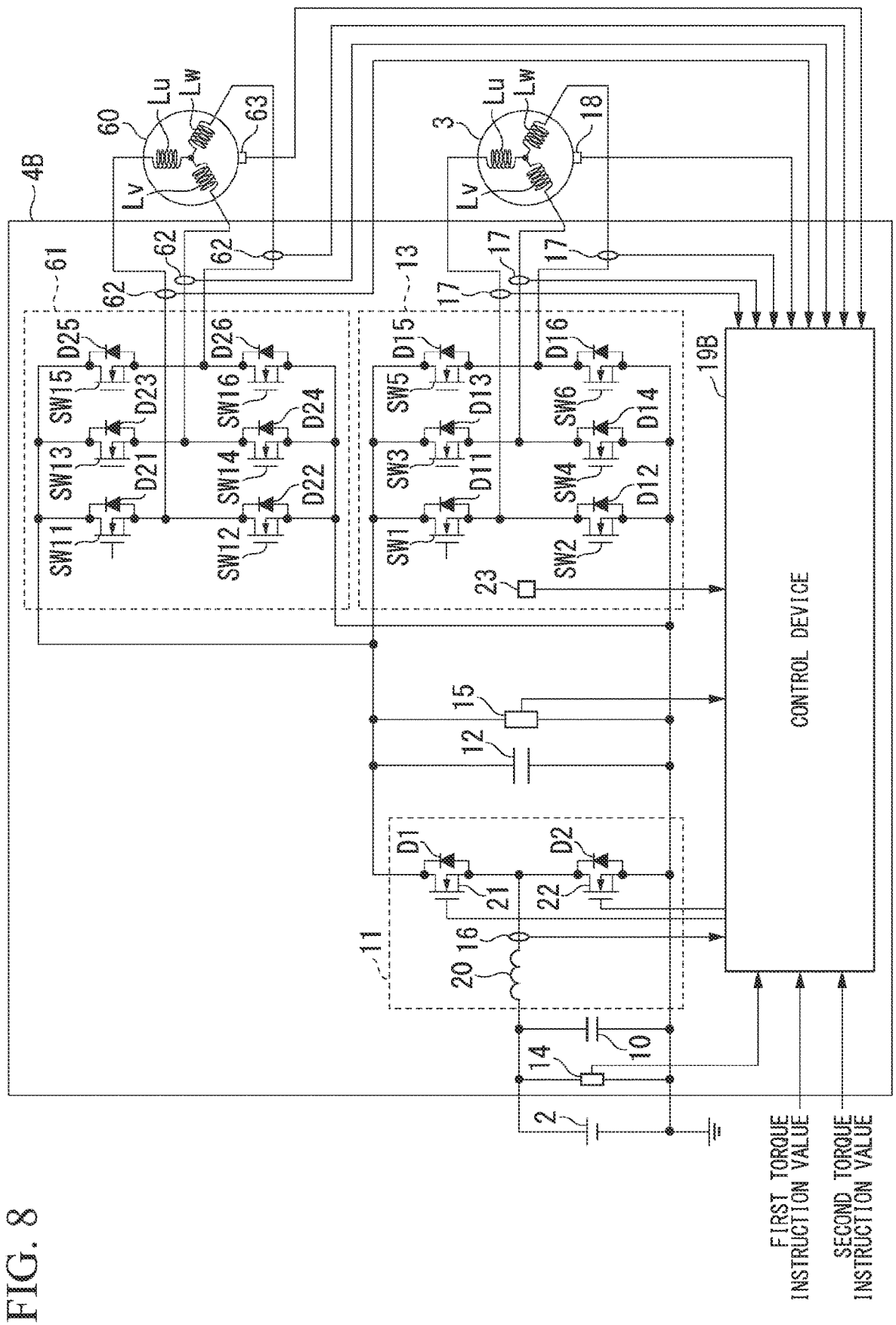
FIG. 8 is a view showing an example of a schematic configuration of a vehicle including a motor control device according to a second embodiment.

Hereinafter, a vehicle 1B including a motor control device 4B according to a second embodiment will be described. The vehicle 1B further includes a motor 60 that is a motor generator in comparison with the first embodiment. FIG. 8 is a view showing an example of a schematic configuration of the vehicle 1B including the motor control device 4B according to the second embodiment. Further, in the drawings, the same or similar portions are designated by the same reference signs, and overlap description thereof may be omitted.

The vehicle 1B is a vehicle including a traveling motor of, for example, a hybrid automobile, an electric automobile, or the like.

As shown in FIG. 8, the vehicle 1B includes a direct current power supply 2, a motor 3, a motor 60, and the motor control device 4B.

The motor 3 is an electric motor configured to generate a driving force of the vehicle 1B using the motor control device 4B. For example, the motor 3 is a traveling motor of a vehicle. The motor 3 is an example of "a first motor" of the present invention.

The motor 60 is a so-called motor generator used as an electric motor configured to start an engine of the vehicle 1B while being used as a generator driven by the engine. The motor 60 is an example of "a second motor" of the present invention.

The motor control device 4B converts direct current electric power from the direct current power supply 2 into alternating current electric power and supplies the converted electric power to the motor 3 and the motor 60. In addition, the motor control device 4B converts regenerative electric power generated by the motor 60 into direct current electric power and supplies the converted electric power to the direct current power supply 2.

In the following description, a configuration of the motor control device 4B according to the second embodiment will be described with reference to FIG. 8. The motor control device 4B according to the second embodiment includes a capacitor 10, a boosting converter 11, a capacitor 12, an inverter 13, an inverter 61, a first voltage sensor 14, a second voltage sensor 15, a first current sensor 16, a second current sensor 17, a third current sensor 62, a rotation angle sensor 18, a rotation angle sensor 63, a temperature acquisition part 23 and a control device 19.

The boosting converter 11 according to the second embodiment boosts a direct current voltage Vb output from the direct current power supply 2 at a predetermined boosting ratio. An input voltage Vs that is a voltage boosted by the boosting converter 11 is a voltage that is input to each of the inverter 13 and the inverter 61. In this way, the boosting converter 11 generates the input voltage Vs by boosting the direct current voltage Vb output from the direct current power supply 2 at a predetermined boosting ratio, and outputs the input voltage Vs to the inverter 13 and the inverter 61.

The inverter 61 converts direct current electric power output from a direct current power supply into alternating current electric power and supplies the converted electric power to the motor 60. Specifically, the input voltage Vs is supplied from the boosting converter 11 to the inverter 61. The inverter 61 converts the electric power from the boosting converter 11 into alternating current electric power and supplies the converted electric power to the motor 60. As shown, the inverter 61 is a three-phase inverter, and includes three switching legs corresponding to the phases.

Specifically, the inverter 61 includes a plurality of switching elements SW11 to SW16, and diodes D21 to D26 parallelly connected to the plurality of switching elements SW11 to SW16, respectively, in opposite directions.

Each of the switching elements SW11 to SW16 may be an IGBT or may be an FET. The switching elements SW11 and SW12 are connected in series to configure a switching leg. The switching elements SW13 and SW14 are connected in series to configure a switching leg. The switching elements SW15 and SW16 are connected in series to configure a switching leg.

A connecting point between the switching element SW11 and the switching element SW12 is connected to a coil Lu of the motor 60. A connecting point between the switching element SW13 and the switching element SW14 is connected to a coil Lv of the motor 60. A connecting point between the switching element SW15 and the switching element SW16 is connected to a coil Lw of the motor 60.

Each of the plurality of third current sensors 62 has the same configuration as the second current sensor 17, and detects each phase current of three phases (U, V and W) of the motor 60.

The rotation angle sensor 63 has the same configuration as the rotation angle sensor 18, detects a rotation angle of the motor 60, and outputs a second detection signal showing the detected rotation angle to the control device 19B.

The control device 19B performs first inverter control of PWM-controlling the switching elements SW1 to SW6 of the inverter 13 on the basis of a first torque instruction value. In addition, the control device 19B performs second inverter control of PWM-controlling the switching elements SW11 to SW16 of the inverter 61. Here, the first torque instruction value is a target value of a motor torque generated by the motor 3, which corresponds to the torque instruction value of the first embodiment. The first inverter control and the second inverter control can employ a known technology.

The control device 19B performs converter control of controlling the upper switching element 21 and the lower switching element 22 in an ON state or an OFF state such that the input voltage Vs is the target input voltage Vx on the basis of the second torque instruction value. For example, the control device 19B PWM-controls the upper switching element 21 and the lower switching element 22 such that the input voltage Vs is the target input voltage Vx under the converter control. The second torque instruction value is a target value of a motor torque generated by the motor 60, which is transmitted to the control device 19B from an external device.

The control device 19B may include a processor such as a CPU, an MPU, or the like, and a non-volatile or volatile semiconductor memory (for example, a RAM, a ROM, a flash memory, an EPROM, or an EEPROM). For example, the control device 19B may have a micro controller such as an MCU or the like. In addition, the control device 19B may have driver circuits of the boosting converter 11, the inverter 13 and the inverter 61.

The temperature acquisition part 23 of the second embodiment detects a measured value or an estimated value of a temperature of at least one switching element of the switching element in the inverter 13 and the switching element in the boosting converter 11 as an element temperature Ksw, like the first embodiment. Further, the temperature acquisition part 23 may acquire the element temperature Ksw by measuring or estimating the temperature of the switching element in the inverter 61. The measurement includes measurement of a temperature of the switching element in the inverter 61, and measurement of a temperature around the switching element in the inverter 61. In addition, the temperature acquisition part 23 of the second embodiment may measure or estimate the temperature of each of the switching elements of the inverter 13 and the inverter 61, and acquire the highest element temperature of the element temperature of the inverter 13 and the element temperature of the inverter 61 as the element temperature Ksw.

The temperature acquisition part 23 of the second embodiment may detect a measured value or an estimated value of the temperature of one or more diodes included in at least one of the boosting converter 11, the inverter 13 and the inverter 61 as the element temperature Ksw.

In this way, the temperature acquisition part 23 detects a measured value or an estimated value of a temperature of at least one semiconductor element among a plurality of semiconductor elements of the switching elements SW1 to SW6 in the inverter 13, the diodes D11 to D16 in the inverter 13, the switching elements 21 and 22 in the boosting converter 11, the diodes D1 and D2 in the boosting converter 11, the switching elements SW11 to SW16 in the inverter 61, and the diodes D21 to D26 in the inverter 61, as the element temperature Ksw.

Figure 9:
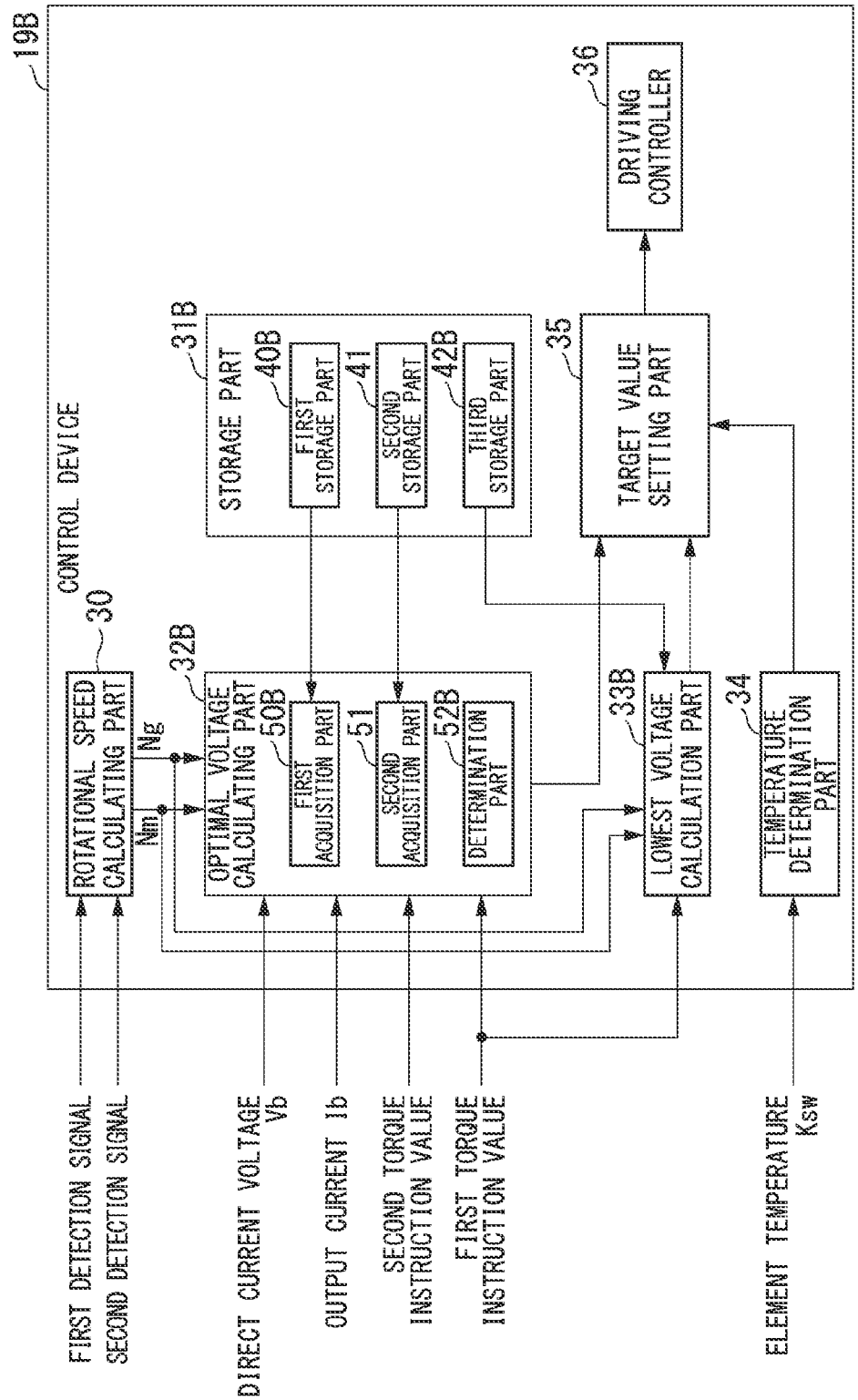
FIG. 9 is a view showing a schematic configuration for performing converter control in the control device according to the second embodiment.

In the following description, a schematic configuration for performing converter control in the control device 19B according to the second embodiment will be described. FIG. 9 is a view showing a schematic configuration for performing converter control in the control device 19B according to the second embodiment.

The control device 19B includes a rotational speed calculating part 30, a storage part 31B, an optimal voltage calculation part 32B, a lowest voltage calculation part 33B, a temperature decision part 34, a target value setting part 35 and a driving controller 36.

The rotational speed calculating part 30 calculates the rotational speed Nm of the motor 3 on the basis of the first detection signal that is a detection signal output from the rotation angle sensor 18. In addition, the rotational speed calculating part 30 calculates a rotational speed Ng of the motor 60 on the basis of the second detection signal output from the rotation angle sensor 63.

The storage part 31 includes a first storage part 40, a second storage part 41 and a third storage part 42B.

Figure 10A:
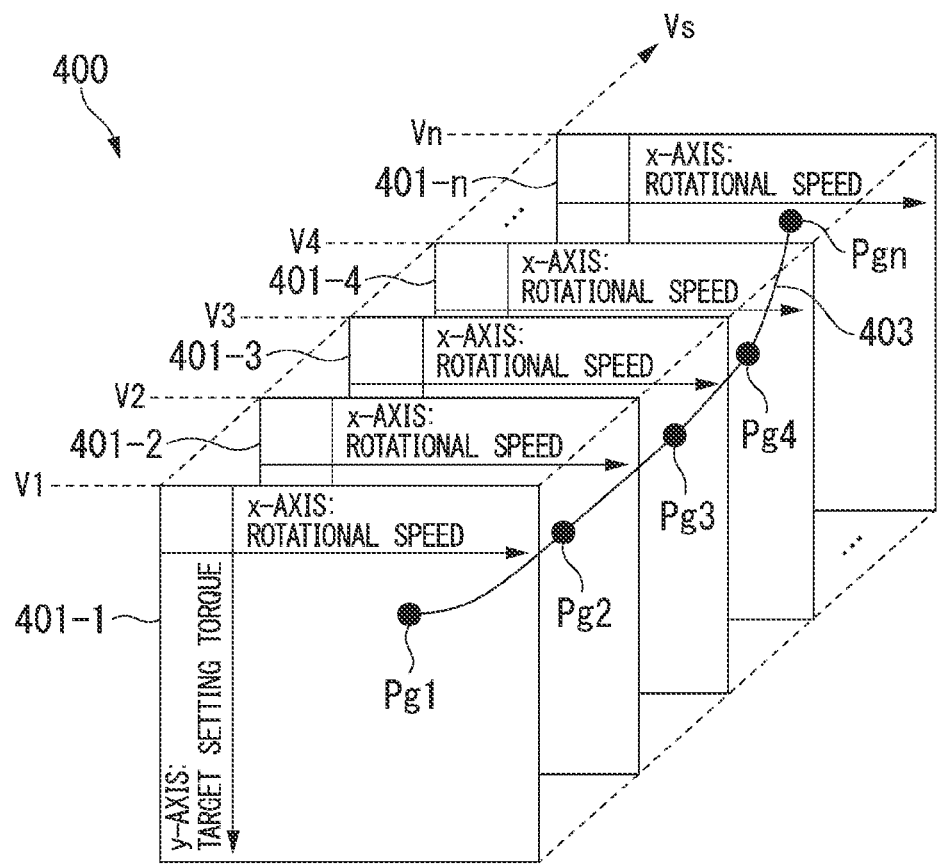
FIG. 10A is a view for describing a third loss map according to the second embodiment.
Figure 10B:
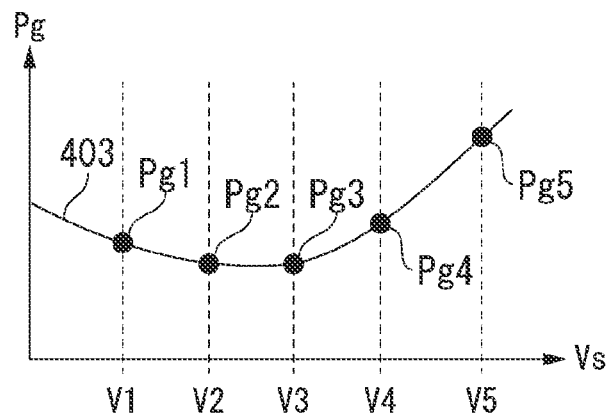
FIG. 10B is a view for describing the third loss map according to the second embodiment.

The first loss map 100 described in the first embodiment is previously stored in the first storage part 40B. Further, a third loss map 400 is previously stored in the first storage part 40B. FIG. 10A and FIG. 10B are views for describing the third loss map 400 according to the second embodiment.

In the third loss map 400, an operating point loss map 401 showing correspondence between the rotational speed Ng of the motor 60, the target setting torque Tref, and an electric power loss Pg of the motor 60 and the inverter 61 is associated with each of the plurality of input voltages Vs. Further, the third loss map 400 is previously set, for example, experimentally or theoretically.

Further, in the second embodiment, in order to discriminate the first loss map 100 and the third loss map 400, the target setting torque Tref defined in each of the operating point loss maps 101 of the first loss map 100 is referred to as "a first target setting torque Tref1" and the target setting torque Tref defined in each of the operating point loss maps 401 of the third loss map 400 is referred to as "a second target setting torque Tref2."

Each of the operating point loss maps 401 is information for calculating the electric power loss Pg from the rotational speed Ng and the second target setting torque Tref2. Here, the rotational speed Ng and the second target setting torque Tref2 define an operation of the motor 60, i.e., a motor operating point. Accordingly, each of the operating point loss maps 401 is information for calculating the electric power loss Pg generated when the motor 60 is operated at the motor operating point defined by the rotational speed Ng and the second target setting torque Tref2. Further, the electric power loss Pk and the electric power loss Pg according to the embodiment are an example of "a second electric power loss" of the present invention.

In the example shown in FIG. 10A, in the third loss map 400, the operating point loss map 401 is associated with each of the plurality of input voltages V1 to Vn. In the example shown in FIG. 10A, the operating point loss map 401-1 defines correspondence between the second target setting torque Tref2 and the rotational speed Ng and the electric power loss Pg1 of the motor 60 when the input voltage Vs is the input voltage V1. The operating point loss map 401-2 defines correspondence between the second target setting torque Tref2 and the rotational speed Ng and the electric power loss Pg2 of the motor 60 when the input voltage Vs is the input voltage V2. The operating point loss map 402-3 defines correspondence between the second target setting torque Tref2 and the rotational speed Ng and the electric power loss Pg3 of the motor 60 when the input voltage Vs is the input voltage V3. The operating point loss map 402-4 defines correspondence between the second target setting torque Tref2 and the rotational speed Ng and the electric power loss Pg4 of the motor 60 when the input voltage Vs is the input voltage V4. The operating point loss map 402-5 defines correspondence between the second target setting torque Tref2 and the rotational speed Ng and the electric power loss Pg5 of the motor 60 when the input voltage Vs is the input voltage V5. The operating point loss map 402-$n$ (n is an integer) defines correspondence between the second target setting torque Tref2 and the rotational speed Ng and the electric power loss Pgn of the motor 60 when the input voltage Vs is the input voltage Vn.

Accordingly, when the motor operating point is set, correspondence between the input voltage Vs and the electric power loss Pg (hereinafter, referred to as "a fourth correspondence") 403 (for example, dependency of the input voltage Vs with respect to the electric power loss Pg) is obtained from the third loss map 400. That is, as shown in FIG. 10B, when the motor operating point is set, if one of the electric power loss Pg and the input voltage Vs is determined, a correlation determined by the other is obtained as a fourth correspondence 403. The fourth correspondence 403 may be a calculation formula, may be a lookup table, or may be graphed.

A first lowest voltage acquisition map 600 and a second lowest voltage acquisition map 700 are previously stored in the third storage part 42B. FIG. 11A is a view for describing an example of the first lowest voltage acquisition map 600 according to the second embodiment. FIG. 11B is a view for describing an example of the second lowest voltage acquisition map 700 according to the second embodiment.

The first lowest voltage acquisition map 600 is information showing correspondence between the rotational speed Nm of the motor 3, the first target setting torque Tref, and a first lowest input voltage Vm (FIG. 11A). The first lowest input voltage Vm is a lowest value of the input voltage Vs required to operate the motor 3 at the motor operating point defined by the rotational speed Nm and the target setting torque Tref of the motor 3. Further, the first lowest voltage acquisition map 600 is previously set, for example, experimentally or theoretically.

The second lowest voltage acquisition map 700 is information showing correspondence between the rotational speed Ng of the motor 60, the second target setting torque Tref2, and a second lowest input voltage Vg (FIG. 11B). The second lowest input voltage Vg is a lowest value of the input voltage Vs required to operate the motor 60 at the motor operating point defined by the rotational speed Ng and the second target setting torque Tref2 of the motor 60. Further, the second lowest voltage acquisition map 700 is previously set, for example, experimentally or theoretically.

Next, a schematic configuration of the optimal voltage calculation part 32B according to the second embodiment will be described. A first acquisition part 50B, a second acquisition part 51 and a determination part 52B are provided.

The first acquisition part 50B refers the first loss map 100 stored in the first storage part 40B. Then, the first acquisition part 50B acquires the first correspondence relationship 103 between the input voltage Vs and the electric power loss Pk by reading the electric power loss Pk corresponding to the rotational speed Nm of the motor calculated by the rotational speed calculating part 30 and the target setting torque Tref1 indicated by the first torque instruction value obtained from the outside from each of the plurality of operating point loss maps 101.

In addition, the first acquisition part 50B refers the third loss map 400 stored in the first storage part 40B. Then, the first acquisition part 50B acquires the fourth correspondence 403 between the input voltage Vs and the electric power loss Pg by reading the electric power loss Pg corresponding to the rotational speed Ng of the motor calculated by the rotational speed calculating part 30 and the target setting torque Tref2 indicated by the second torque instruction value obtained from the outside from each of the plurality of operating point loss maps 401.

The determination part 52B obtains the input voltage Vs at which a total loss Pz that is a total of the electric power loss Pk, the electric power loss Pg and the electric power loss Pc is lowest on the basis of the first correspondence relationship 103, the second correspondence relationship 203 and the fourth correspondence 403. Then, the determination part 52B transmits the input voltage Vs to the target value setting part 35 as the optimal input voltage Vref.

As an example, as shown in FIG. 12, the determination part 52B synthesizes the first correspondence relationship 103, the second correspondence relationship 203 and the fourth correspondence 403, and obtains a fifth correspondence 503 that is a correspondence between the input voltage Vs and the total loss Pz. The fifth correspondence 503 may be a calculation formula, may be a lookup table, or may be graphed. For example, as shown in FIG. 12, in the first correspondence relationship 103, the electric power loss Pk corresponding to each of the input voltages V1 to V5 (n=5) is defined. In addition, in the second correspondence relationship 203, the electric power loss Pc corresponding to each of the input voltages V1 to V5 (n=5) is defined. In addition, the electric power loss Pg corresponding to each of the input voltages V1 to V5 (n=5) is defined in the fourth correspondence 403.

Accordingly, the determination part 52B can obtain the fifth correspondence 503 defined by electric power losses Pz (Pz1 to Pz5) corresponding to the respective input voltages V1 to V5 (n=5) by summing the electric power loss Pk, the electric power loss Pc and the electric power loss Pg of the same input voltage for every input voltage. Further, the determination part 52B may obtain the electric power loss Pz between two points (for example, between Pz1 and Pz2, between Pz2 and Pz3, between Pz3 and Pz4, and between Pz4 and Pz5) in the fifth correspondence 503 by performing interpolation processing such as linear supplement, polynomial interpolation, or the like.

Then, the determination part 52B retrieves the lowest electric power Pmin that is the lowest total loss Pz in the fifth correspondence 503, and obtains the input voltage Vs when it is the lowest electric power Pmin as the optimal input voltage Vref. That is, the determination part 52B retrieves the input voltage Vs that is the lowest total loss Pz in the fifth correspondence 503, and sets the input voltage Vs as the optimal input voltage Vref.

The lowest voltage calculation part 33B reads the first lowest input voltage Vm corresponding to the rotational speed Nm of the motor 3 calculated by the rotational speed calculating part 30 and the first target setting torque Tref1 indicated by the first torque instruction value from the first lowest voltage acquisition map 600. In addition, the lowest voltage calculation part 33B reads the second lowest input voltage Vg corresponding to the rotational speed Ng of the motor 60 calculated by the rotational speed calculating part 30 and the second target setting torque Tref2 indicated by the second torque instruction value from the second lowest voltage acquisition map 700. Then, the lowest voltage calculation part 33B compares the first lowest input voltage Vm and the second lowest input voltage Vg, and sets a higher voltage of the first lowest input voltage Vm and the second lowest input voltage Vg as the lowest input voltage Vmin. The lowest voltage calculation part 33B transmits the set lowest input voltage Vmin to the target value setting part 35.

Figure 13:
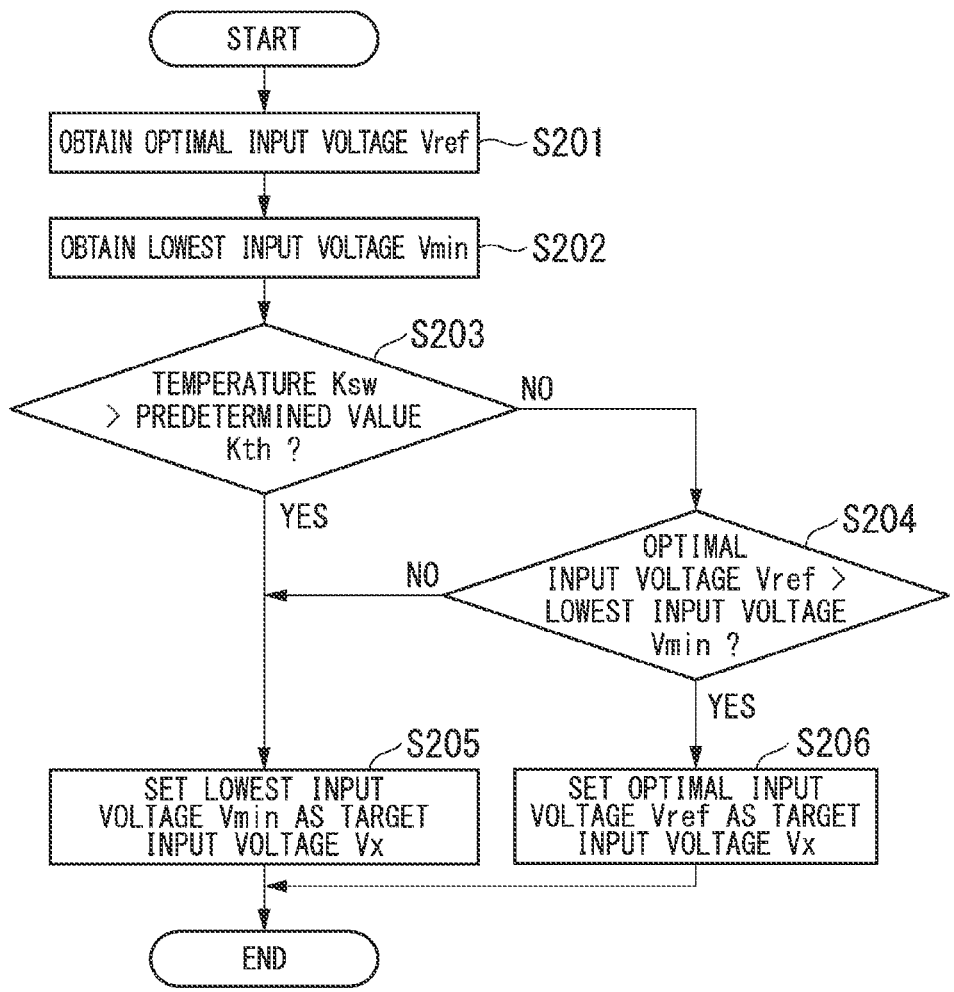
FIG. 13 is a view showing a flow of an operation of the converter control according to the second embodiment.

A flow of an operation of the converter control according to the second embodiment will be described with reference to FIG. 13. FIG. 13 is a view showing a flow of the operation of the converter control according to the second embodiment.

The control device 19B controls the boosting converter 11 by repeating an operation shown in FIG. 13 for every fixed period.

The optimal voltage calculation part 32B acquires a first torque instruction value from an external device, acquires the rotational speed Nm from the rotational speed calculating part 30, and obtains the first correspondence relationship 103 between the input voltage Vs and the electric power loss Pk on the basis of the first torque instruction value and the rotational speed Nm. The optimal voltage calculation part 32B acquires a second torque instruction value from an external device, acquires the rotational speed Ng from the rotational speed calculating part 30, and obtains the fourth correspondence 403 between the input voltage Vs and the electric power loss Pg on the basis of the second torque instruction value and the rotational speed Ng. Further, the optimal voltage calculation part 32 acquires the direct current voltage Vb from the first voltage sensor 14, acquires the output current Ib from the first current sensor 16, and obtains the second correspondence relationship 203 between the input voltage Vs and the electric power loss Pc on the basis of the direct current voltage Vb and the output current Ib. Then, the optimal voltage calculation part 32 obtains the input voltage Vs that is the lowest total loss Pz of the electric power loss Pk, the electric power loss Pc and the electric power loss Pg on the basis of the first correspondence relationship 103, the second correspondence relationship 203 and the fourth correspondence 403, and sets the input voltage Vs as the optimal input voltage Vref (step S201).

The lowest voltage calculation part 33B reads the first lowest input voltage Vm corresponding to the rotational speed Nm of the motor 3 calculated by the rotational speed calculating part 30 and the first target setting torque Tref1 indicated by the first torque instruction value from the first lowest voltage acquisition map 600. In addition, the lowest voltage calculation part 33B reads the second lowest input voltage Vg corresponding to the rotational speed Ng of the motor 60 calculated by the rotational speed calculating part 30 and the second target setting torque Tref2 indicated by the second torque instruction value from the second lowest voltage acquisition map 700. Then, the lowest voltage calculation part 33B sets a voltage having a higher voltage value of the first lowest input voltage Vm and the second lowest input voltage Vg as the lowest input voltage Vmin (step S202).

The temperature decision part 34 determines whether the element temperature Ksw is equal to or greater than the predetermined value Kth (step S203). Then, the element temperature Ksw outputs the decision result to the target value setting part 35.

The target value setting part 35 determines whether the optimal input voltage Vref is greater than the lowest input voltage Vmin when the element temperature Ksw is equal to or smaller than the predetermined value Kth in the above mentioned decision result (step S204). Then, the target value setting part 35 sets the optimal input voltage Vref to the target input voltage Vx when the optimal input voltage Vref is greater than the lowest input voltage Vmin (step S205). Meanwhile, in step S204, the target value setting part 35 sets the lowest input voltage Vmin to the target input voltage Vx when the optimal input voltage Vref is equal to or smaller than the lowest input voltage Vmin (step S206).

The target value setting part 35 sets the lowest input voltage Vmin to the target input voltage Vx when the element temperature Ksw is greater than the predetermined value Kth in step S203 (step S206).

Hereinabove, while the embodiments of the present invention have been described in detail with reference to the accompanying drawings, the specific configurations are not limited to the embodiments and also include designs or the like without departing from the scope of the present invention.

Variant 1

For example, the control device 19 or 19B is not particularly limited to the method of obtaining the optimal input voltage Vref or the method of obtaining the lowest input voltage Vmin, and may calculate the voltage by a method other than the methods described in the first embodiment and the second embodiment. For example, the control device 19 or 19B may calculate the optimal input voltage Vref or the lowest input voltage Vmin using a known technology.

Variant 2

The boosting converter 11 according to the first embodiment and the second embodiment may be a multi-phase converter having two or more phases. In addition, the boosting converter 11 may have a plurality of reactors 20, and the plurality of reactors 20 may be magnetically coupled to each other.

Hereinabove, as described above, the motor control device according to the embodiment sets the lowest input voltage Vmin lower than the optimal input voltage Vref to the target input voltage Vx when the element temperature Ksw is greater than the predetermined value Kth.

According to the above-mentioned configuration, heat generation of the switching element in the boosting converter 11 or the inverter 13 or 61 can be minimized.

Further, all or a part of the control device 19 or the control device 19B may be realized by a computer. In this case, the computer may include a processor such as a CPU, a GPU, or the like, and a computer-readable recording medium. Then, all or some of the functions of the control device 19 or the control device 19B may be realized by recording a program realized by the computer on the computer-readable recording medium and reading and executing the program recorded on the recording medium using the processor. Here, "the computer-readable recording medium" refers a portable medium such as a flexible disk, an opto-magnetic disk, a ROM, a CD-ROM, or the like, a hard disk installed in a computer system, or the like. Further, "the computer-readable recording medium" may include a medium configured to dynamically hold the program for a short time, for example, a communication line when the program is transmitted via a network such as the Internet or a communication line such as a telephone line or the like, or a medium configured to hold a program for a fixed time such as a volatile memory in a computer system that is a server or a client in this case. In addition, the program may be provided to realize some of the above-mentioned functions, further, may be realized by combination with a program in which the above-mentioned functions are already recorded in the computer system, or may be realized using a programmable logic device such as an FPGA or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A motor control device configured to control driving of a motor using electric power from a direct current power supply, the motor control device comprising:
   an inverter that is configured to convert direct current electric power output from the direct current power supply into alternating current electric power and that is configured to supply the converted electric power to the motor;
   a converter that is configured to convert a direct current voltage from the direct current power supply into an input voltage, which is a voltage input to the inverter, and that is configured to supply the converted voltage to the inverter;
   a temperature acquisition part configured to measure an element temperature that is a temperature of a semiconductor element included in at least one of the inverter and the converter or configured to estimate a temperature of the semiconductor element; and
   a control device configured to control at least one of the inverter and the converter such that the input voltage becomes a target input voltage that is a target value,
   wherein the control device comprises:
   a rotational speed calculating part configured to calculate a rotational speed of the motor;
   an optimal voltage calculation part configured to calculate an optimal input voltage that is an input voltage at which a total of electric power losses generated in the inverter, the motor and the converter is lowest when the motor is operated at a motor operating point which is defined by the rotational speed that is calculated by the rotational speed calculating part and a target setting torque that is a target value of a torque generated by the motor;
   a lowest voltage calculation part configured to calculate a lowest input voltage that is a lowest value of the input voltage required to operate the motor at the motor operating point; and
   a target value setting part configured to set any one of the optimal input voltage and the lowest input voltage as the target input voltage, and
   the target value setting part sets a lowest input voltage lower than the optimal input voltage to the target input voltage when a measured value or an estimated value of the element temperature is greater than a predetermined value.

2. The motor control device according to claim 1, wherein the target value setting part sets the optimal input voltage as the target value when the measured value or the estimated value is less than the predetermined value and when the optimal input voltage is greater than the lowest input voltage, and sets the lowest input voltage as the target input voltage when the measured value or the estimated value is equal to or greater than the predetermined value.

3. The motor control device according to claim 2, further comprising:
   a voltage detection part configured to detect the direct current voltage;
   a current detection part configured to detect an output current that is a current output from the direct current power supply to the converter;
   a first storage part configured to have previously stored a first loss map in which an operating point loss map, which shows a correspondence between the rotational speed, the target setting torque and a first electric power loss that is a total value of the electric power loss of the motor and the electric power loss of the inverter, is associated with each of the plurality of input voltages;
   a second storage part configured to previously store a second loss map in which a converter loss map which shows a correspondence between the direct current voltage, the output current and a second electric power loss that is the electric power loss of the converter, is associated with each of the plurality of input voltages; and a lowest voltage acquisition map which shows a correspondence between the rotational speed, the target setting torque and the lowest input voltage, wherein the optimal voltage calculation part comprises:

a first acquisition part configured to acquire a first correspondence relationship between the input voltage and the first electric power loss by reading the first electric power loss, which corresponds to the rotational speed of the motor calculated by the rotational speed calculating part and the target setting torque indicated by a torque instruction value obtained from the outside, from each of the plurality of operating point loss maps;

a second acquisition part configured to acquire a second correspondence relationship between the input voltage and the second electric power loss by reading the second electric power loss, which corresponds to the direct current voltage measured by the voltage detection part and the output current measured by the current detection part, from each of a plurality of converter loss maps; and a determination part configured to obtain an input voltage that is a lowest total of the first electric power loss and the second electric power loss on the basis of the first correspondence relationship and the second correspondence relationship and transmit the input voltage to the target value setting part as the optimal input voltage, and the lowest voltage calculation part reads the lowest input voltage, which corresponds to the rotational speed of the motor calculated by the rotational speed calculating part and the target setting torque indicated by the torque instruction value, from the lowest voltage acquisition map, and transmits the read lowest input voltage to the target value setting part.

4. The motor control device according to claim 1, further comprising:

a voltage detection part configured to detect the direct current voltage;

a current detection part configured to detect an output current that is a current output from the direct current power supply to the converter;

a first storage part configured to have previously stored a first loss map in which an operating point loss map, which shows a correspondence between the rotational speed, the target setting torque and a first electric power loss that is a total value of the electric power loss of the motor and the electric power loss of the inverter, is associated with each of the plurality of input voltages;

a second storage part configured to previously store a second loss map in which a converter loss map which shows a correspondence between the direct current voltage, the output current and a second electric power loss that is the electric power loss of the converter, is associated with each of the plurality of input voltages; and a lowest voltage acquisition map which shows a correspondence between the rotational speed, the target setting torque and the lowest input voltage, wherein the optimal voltage calculation part comprises:

a first acquisition part configured to acquire a first correspondence relationship between the input voltage and the first electric power loss by reading the first electric power loss, which corresponds to the rotational speed of the motor calculated by the rotational speed calculating part and the target setting torque indicated by a torque instruction value obtained from the outside, from each of the plurality of operating point loss maps;

a second acquisition part configured to acquire a second correspondence relationship between the input voltage and the second electric power loss by reading the second electric power loss, which corresponds to the direct current voltage measured by the voltage detection part and the output current measured by the current detection part, from each of a plurality of converter loss maps; and a determination part configured to obtain an input voltage that is a lowest total of the first electric power loss and the second electric power loss on the basis of the first correspondence relationship and the second correspondence relationship and transmit the input voltage to the target value setting part as the optimal input voltage, and the lowest voltage calculation part reads the lowest input voltage, which corresponds to the rotational speed of the motor calculated by the rotational speed calculating part and the target setting torque indicated by the torque instruction value, from the lowest voltage acquisition map, and transmits the read lowest input voltage to the target value setting part.

* * * * *